United States Patent
Romer et al.

(10) Patent No.: US 10,632,460 B2
(45) Date of Patent: Apr. 28, 2020

(54) PIPETTING DEVICE FOR PIPETTING SMALL VOLUMES OF LIQUIDS

(71) Applicant: Hamilton Bonaduz AG, Bonaduz (CH)

(72) Inventors: Hanspeter Romer, Hinwil (CH); Fridolin Gysel, Adliswil (CH); Urs Lendenmann, Chur (CH)

(73) Assignee: Hamilton Bonaduz AG, Bonaduz (CH)

( * ) Notice: Subject to any disclaimer, the term of this patent is extended or adjusted under 35 U.S.C. 154(b) by 0 days.

(21) Appl. No.: 15/740,229

(22) PCT Filed: Jul. 26, 2016

(86) PCT No.: PCT/EP2016/067747
§ 371 (c)(1),
(2) Date: Dec. 27, 2017

(87) PCT Pub. No.: WO2017/017084
PCT Pub. Date: Feb. 2, 2017

(65) Prior Publication Data
US 2018/0185836 A1    Jul. 5, 2018

(30) Foreign Application Priority Data
Jul. 30, 2015    (DE) .................. 10 2015 214 566

(51) Int. Cl.
*B01L 3/02*    (2006.01)
*G01N 35/10*    (2006.01)

(52) U.S. Cl.
CPC .......... *B01L 3/0227* (2013.01); *B01L 3/0237* (2013.01); *B01L 2200/14* (2013.01); *B01L 2400/0478* (2013.01); *G01N 35/1065* (2013.01)

(58) Field of Classification Search
CPC ...... B01L 3/0227; B01L 3/022; B01L 3/0237; B01L 2200/14; B01L 2200/0605; B01L 2400/0478; G01N 35/1065; G01N 35/1074
(Continued)

(56) References Cited

U.S. PATENT DOCUMENTS 6,499,515 B2    1/2002    Sander
9,186,666 B2    11/2015    Hofstetter et al.
(Continued)

FOREIGN PATENT DOCUMENTS

DE           100 22 398       11/2001
DE       10 2010 064049        6/2012
(Continued)

OTHER PUBLICATIONS

German Search Report for German patent application No. 10 2015 214 566.2, dated May 5, 2016; 13 pages.
(Continued)

*Primary Examiner* — Robert R Raevis
(74) *Attorney, Agent, or Firm* — Rankin, Hill & Clark LLP

(57) ABSTRACT

A pipetting device has a pipetting channel extending along a channel path, in which a piston is accommodated to be movable along the channel path to change the pressure of a working gas that wets the piston on a dosing side facing the dosing liquid. The pipetting device includes a movement drive for driving the piston along the channel path and a control unit configured to operate the movement drive for pipetting a predetermined single dosing volume of less than 5 μl with the piston moving in the pipetting direction and its dosing side end face sweeping over a pipetting volume which is not less than 1.4 times greater than the single dosing volume, and subsequently moving in a counter pipetting
(Continued)

Figure 1:
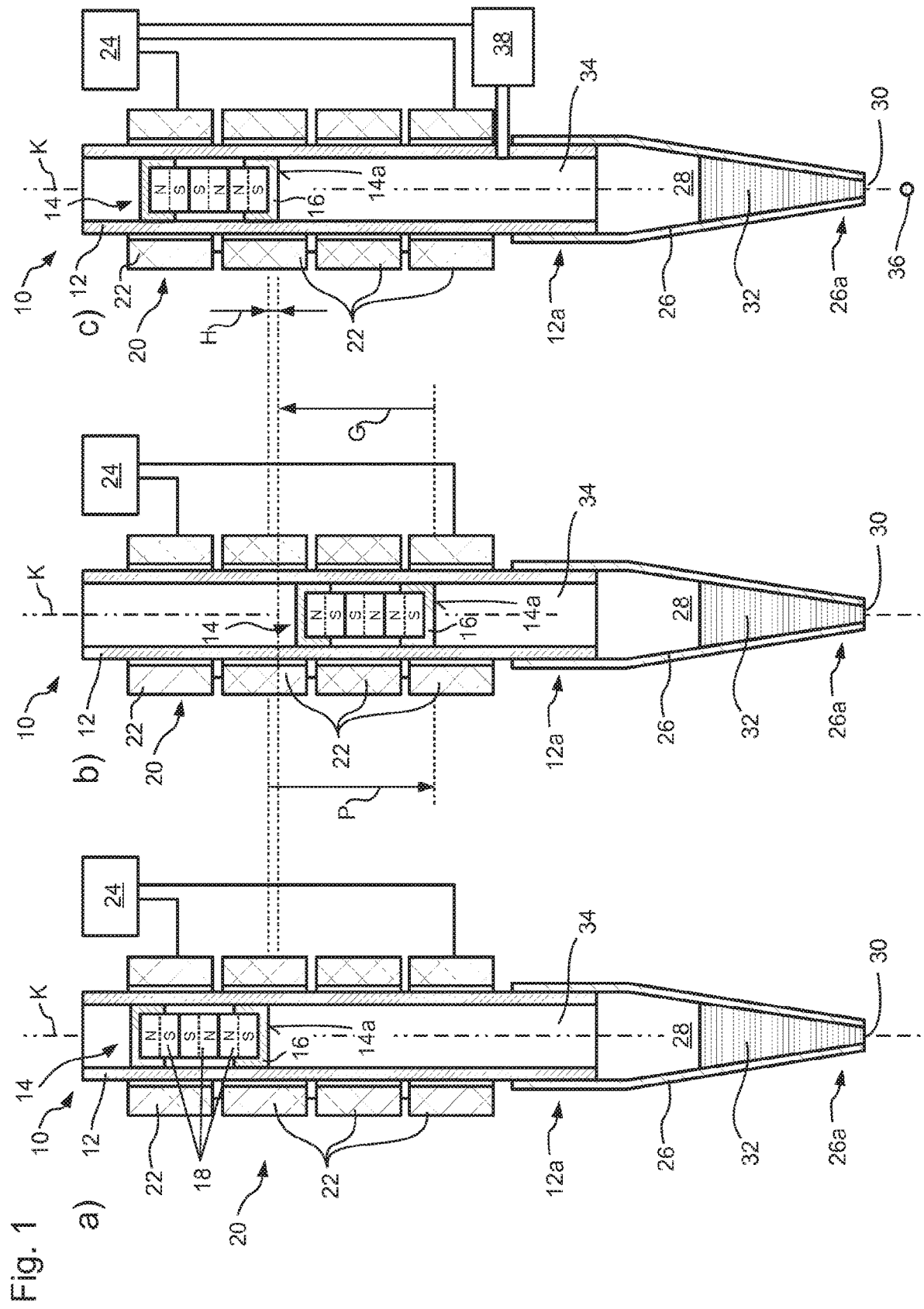

direction and its dosing side end face sweeping over a counter pipetting volume, wherein not more than 50 ms elapse between beginning control signals.

21 Claims, 4 Drawing Sheets

(58) Field of Classification Search
USPC ....... 422/501, 502, 504, 505, 509, 515, 521, 422/522; 222/1, 63, 71, 249, 319, 333, 222/335, 336, 340, 341, 372, 373, 394; 73/64.56, 863.32, 864.11, 864.13, 73/864.16–864.18, 864.21–864.25
See application file for complete search history.

(56) References Cited

U.S. PATENT DOCUMENTS

| | | |
|---|---|---|
| 2001/0016358 A1 | 8/2001 | Hidetaka et al. |
| 2002/0011276 A1 | 1/2002 | Sander |
| 2006/0071973 A1 | 4/2006 | Peeters |
| 2010/0199788 A1* | 8/2010 | Ayliffe .................. B01L 3/0275 73/864.11 |
| 2013/0001242 A1 | 1/2013 | Hofstetter et al. |
| 2013/0233096 A1 | 9/2013 | Schlegel et al. |
| 2014/0296089 A1* | 10/2014 | Holmes ................ G01N 35/026 506/9 |

FOREIGN PATENT DOCUMENTS

| | | |
|---|---|---|
| EP | 2656917 | 10/2013 |
| JP | 2009-210354 | 9/2009 |
| JP | 2010-025953 | 2/2010 |
| JP | 2013-516618 | 5/2013 |
| WO | 2011083125 | 7/2011 |

OTHER PUBLICATIONS

Written Opinion and International Search Report for International patent application No. PCT/EP2016/067747, dated Nov. 3, 2016; 10 pages.
Japanese Office Action of JP S/N 2018-501895 dated Dec. 10, 2018, 6 pages.
English Translation of Japanese Office Action of JP S/N 2018-501895 dated Dec. 10, 2018, 7 pages.
International Preliminary Report on Patentability for International patent application No. PCT/EP2016/067747, dated Jan. 30, 2018; 6 pages.
Extended European Search Report of S/N 19211204.3 dated Jan. 17, 2020, 7 pages.

* cited by examiner

PIPETTING DEVICE FOR PIPETTING SMALL VOLUMES OF LIQUIDS

The present invention relates to a pipetting device for pipetting dosing liquids, wherein pipetting comprises an aspiration and a dispensation of the dosing fluid, comprising a pipetting channel extending along a channel path, in which pipetting channel a piston configured as a solid body at least in sections is movably accommodated along the channel path in order to change, by means of the movement along the channel path, the pressure of a working gas which wets the piston on a dosing side facing the dosing liquid, wherein the pipetting device comprises a movement drive for the piston by which means the piston is drivable in a movement along the channel path, wherein the pipetting device has a control unit for controlling the movement drive, said control unit is configured to operate the movement drive in dispensation operation in such a way that the piston is initially moved along the channel path in a dispensation direction increasing the pressure of the working gas, and is subsequently moved in an aspiration direction, opposite the dispensation direction, reducing the pressure of the working gas.

These types of pipetting devices are sufficiently known in the prior art. Conventionally, the movement drive comprises a rotating electric motor with a spindle drive or another transmission, by means of which the piston is drivable to move along the channel path by means of the electric motor with mechanical movement switching. Disadvantages in this mechanical movement transmission between the electric motor and the piston include: the large masses to be moved, movement play that is never completely excluded, the vulnerability and deformability of transmission components, and the movement accuracy and the movement dynamics limited in connection thereto.

During aspiration, an exact amount of dosing liquid, thus the taking in of the desired amount of dosing liquid into a pipette cavity, for example a pipette tip, of the pipetting device, is generally less problematic: since the aspiration may always be interrupted following the accommodation of the desired amount of dosing liquid by lifting the pipette tip out of a reservoir of dosing liquid while the piston is stationary, whereas volume-precise dispensation of a dosing liquid depends on releasing the desired amount of dosing fluid out of the pipette opening. During dispensation, influencing variables, like the viscosity of the dosing liquid, its density, and its surface tension, therefore play an important role.

Large amounts of dosing liquid, thus amounts greater than 5 µl, are generally pipetted in a synchronous operating mode of the pipetting device in which the dosing liquid in the pipette tip, more precisely the meniscus of the dosing liquid facing the piston, synchronously follows the dosing-side end face of the piston. This means that, when the piston is moved in a dispensation direction as a pipetting direction, the meniscus is then moved together with the dosing-side end face of the piston toward the pipette opening of the pipetting device, and is then moved away from the pipette opening of the pipetting device, together with the dosing-side end face of the piston, when the piston is moved in an aspiration direction as a pipetting direction. A minor time lag between the movement of the dosing-side end face of the piston and the meniscus of the dosing liquid may occur, as the working gas present between the piston and the dosing liquid must initially be brought up to a pressure level by the piston movement, at which pressure level the desired pipetting process may be carried out. During aspiration, this is a negative pressure with respect to the ambient pressure so that dosing fluid, driven by the differential pressure between the pressure of the working gas and the ambient pressure, flows into the pipette tip out of a dosing fluid reservoir in which the pipette opening of the pipette tip is immersed. During dispensation, this is a positive pressure with respect to the ambient pressure so that dosing liquid, taken up in the pipette tip, discharges through the pipette opening of the pipette tip driven by the differential pressure between the pressure of the working gas and the ambient pressure. The compressible working gas thus acts like a gas spring. Due to the low, yet present, time lag between the piston movement and the movement of the meniscus of the dosing liquid in the pipette tip, the conventional pipetting of dosing liquid is subsequently designated as a quasi-synchronous operating mode.

During conventional dispensation with a quasi-synchronous movement of piston and dosing liquid, the tearing off of the dosing liquid to be dispensed from the pipette tip is caused by exploiting inertial forces. The piston is moved for a predetermined time in the dispensation direction and then, if a tearing off of displaced dosing liquid out of the pipette tip is desired, the piston is stopped as suddenly as possible. The inertial mass of the dosing liquid already displaced, which is still moving in the dispensation direction due to the preceding piston movement, then leads to pinching off part of the dosing liquid at the pipette tip and subsequently to the tearing off of the same. The relationship between the piston movement and dosing liquid displaced by means of the working gas is conventionally determined empirically for different liquid classes and is then stored in a data memory of the pipetting device. In this quasi-synchronous operating mode, the volume (pipetting volume) swept over by the dosing-side piston surface during the movement of the piston in the pipetting direction generally exceeds the actually pipetted volume of the dosing liquid by not more than 5%. As a rule, the ratio of pipetting volume to actually pipetted dosing liquid volume is subsequently not greater than 1.05.

Due to the tearing off of the liquid induced by inertia at the pipette opening, dosing liquid sometimes remains adhered in an undesired way outside on the pipette tip in the area of the pipette opening. To prevent this adhering amount of liquid from dropping off completely or partially in an uncontrolled way, the piston is moved a small amount in the aspiration direction after the tearing off of the liquid in order to suction the dosing fluid adhering outside back through the pipette opening into the pipette tip.

This dispensation of dosing liquid by exploiting inertial forces no longer safely functions, depending on the respective dosing liquid, for single dosing volumes of less than 3 to 5 µl, because, due to the low mass, the achievable inertial forces, may no longer suffice to safely overcome other influencing forces, in particular surface tension, in order to by able to guarantee a safe, repeatable separation of these types of small amounts of dosing liquid.

The previously mentioned pipetting devices should be distinguished from the so-called "dispensers", which generally exclusively dispense dosing liquid, however, they man bot aspirate it. Dispensers generally obtain the dosing liquid to be dispensed via supply channels from a reservoir, which is in flow connection with a dosing space of the dispenser that may be altered by the piston.

Pipetting devices, in which the dosing-side end face of the piston is directly in contact with the dosing liquid to be pipetted, are also to be distinguished from the previously mentioned pipetting devices. There is no working gas located between the piston and the dosing liquid.

Because of the direct coupling movement of piston and dosing liquid in these types of pipetting devices, these pipettes are designated in professional circles using the English term "positive displacement". Omitting of compressibility in the working gas indeed increases the theoretically achievable pipetting accuracy; however, it leads in practice to difficulties at another point. On the one hand, a gas inclusion in the pipetting volume may not be safely excluded during aspiration so that gas or air bubbles may occur in the aspirated dosing liquid even in positive displacement pipettes, which may disadvantageously affect the achievable pipetting accuracy. On the other hand, the pipetting accuracy achievable using positive displacement pipetting is then quite low if the dosing liquid tends toward foam formation. In addition, due to the wetting of the pipetting piston by the dosing fluid, if the dosing liquid to be pipetted needs to be changed, then not only a pipette tip, but also the pipetting piston must also be changed with this, which indicates a substantial assembly expense and thus subsequently substantial costs.

In contrast to this, the type of pipetting using generic pipetting devices with a working gas between the piston and the dosing liquid is designated in the professional world as "air displacement", even if the working gas does not necessarily have to be air, but instead may be an inert gas or a quasi-inert gas, like nitrogen for example. In this type of pipette, the pipetting piston is constantly and completely separated from the dosing liquid by a gas column, in particular by an air column.

The present pipetting device according to the invention is also to be distinguished from those that use a column of a system liquid as a piston. A certain level of contamination risk arises from these types of system liquids since it may not currently be excluded that the system liquid, thus a part of a virtually liquid piston, enters into the pipetting dosing liquid. The piston of the pipetting device of the present invention is at least partially, preferably completely, configured as a solid body to prevent a risk of contamination. In the sectional design as a solid body, at least the dosing side end face of the piston facing the dosing liquid is configured as a solid body to prevent a transmission of liquid to liquid.

A pipetting device with a piston driven by a linear motor is known from WO 2011/083125 A1. This has no need for a transmission providing movement between the stator of the linear motor and the piston.

A pipetting device with a piston driven by a linear motor is likewise known from JP 2012-167968 A.

A pipetting device is known from US 2001/0016358 A which, based on the piston type clear from the sectional view and based on the information that the piston is moved prior to the aspiration to the lower end of the pipette and that the pipette and the piston must be exchanged in the case of a change of the dosing liquid, clearly works according to the principle of "positive displacement" in which a drop of dosing liquid may be ejected from the pipette tip in jet mode, in that the piston is abruptly moved around 10 µm in the dispensation direction by the linear stepper motor that drives it by transferring movement to a linkage. This abrupt piston movement may alternatively be caused by a piezo actuator.

Due to the abrupt minor piston movement of only 10 µm in the dispensation direction, the piston strikes the dosing liquid accommodated in the pipetting device and thus ejects a drop of the dosing liquid through the pipette opening in the direction of a dosing target. The ejected drop amount depends, according to the information in US 2001/0016358 A on the size of the pipette opening, the movement path traveled by the piston, and the time duration required for the movement. Using the method for dispensing described in US 2001/0016358 A, drops of approximately 100 nl are allegedly achievable. Smaller drops are achieved by placing an aperture plate in front of the actual pipette opening with a smaller opening than the pipette opening.

In the jet mode described in US 2001/0016358 A, this is a type of dispensation in which the dispensed liquid amount reaches the dosing target in a ballistic flight or fall, i.e., the dispensed amount of liquid completely leaves the pipette opening before it reaches the dosing target and travels a path in flight or while falling.

The present invention likewise relates to a pipetting method for pipetting, thus to aspiration and dispensation, of a predetermined single-dosing volume of a dosing liquid, comprising the following steps:

Providing a quantity of working gas and a pipetting volume, which is accessible through a pipette opening and is at least partially filled with the working gas, Providing a piston moveable along a channel path in the pipetting direction and in a counter pipetting direction opposite thereto, and Moving a piston along the channel path and thus changing the pressure of the working gas by means of the dosing side end face of the piston facing the pipette opening and by this means pipetting the dosing liquid.

The explanation above with respect to generic pipetting devices applies likewise with respect to the generic pipetting method.

The object of the present invention is to provide technical teaching which enables precisely repeatable pipetting of predetermined single dosing volumes of less than 5 µl using generic pipetting devices functioning according to the "air displacement" principle, without having the piston enter into contact with the dosing liquid during the pipetting process.

This problem is solved according to the invention by a generic pipetting device is which the piston is movable in a whiplike manner.

This whiplike movability of the piston of the pipetting device according to the invention is expressed in different specific aspects of the piston movement during pipetting:

According to a first aspect of the present invention, the whiplike movability of the piston is implemented in that the control unit is configured to operate the movement drive for pipetting a predetermined single dosing volume of less than 5 µl in such a way that the piston is moved in the pipetting device, and thereby its dosing side end face sweeps over a dosing volume that is not less than 1.4 times greater than the single dosing volume, and the piston is subsequently moved in a counter pipetting direction opposite to the pipetting direction and its dosing side end face thereby sweeps over a counter pipetting volume, wherein not more than 50 ms, preferably not more than 30 ms, elapse between the beginning of the control signal from the control unit for driving the piston in the pipetting direction and the end of the control signal for driving the piston in the counter pipetting direction.

This aspect takes into account the control signal controlling the piston movement, which the piston generally follows based on mass inertia, friction, and similar external influences with a time lag and with a certain deviation of the actual piston movement from the target movement predetermined by the control signal. The control of a piston following the target movement sufficiently exactly already leads to success according to the invention, subsequently described in greater detail, and realizes the desired effects using the present invention.

Based on the actual piston movement, a whiplike movement of the piston according to a second aspect of the present invention is realized in that the control unit is configured to operate the movement drive for pipetting a predetermined single dosing volume of less than 5 µl in such a way that the piston is moved, starting from a start position, in the pipetting direction, and its dosing side end face thereby sweeps over a dosing volume that is not less than 1.4 times greater than the single dosing volume, and the piston, subsequently starting from a reversal point of the movement direction, is moved in a counter pipetting direction opposite to the pipetting direction and its dosing side end face thereby sweeps over a counter pipetting volume, wherein not more than 50 ms, preferably not more than 30 ms, elapse between the points in time at which the piston reaches that point, which corresponds to the halfway point between the piston start position and the piston reversal position, in the pipetting direction and in the counter pipetting direction respectively.

The second aspect depends on the first aspect and represents an independent realization of the inventive concept of the present invention. The first and the second aspects may also be mutually realized in combination in a pipetting device.

The inclusion of the time which the piston requires in order to move, starting from the location of the "halfway point", thus the midpoint of the path between the piston start position and dead center with a reversal of movement direction from the pipetting direction into the counter pipetting direction (reversal point for the movement direction), to the dead point and back to the location of the halfway point, ensures a suppression of deviations in the actual piston movement from the piston target movement, which may occur, for example, around the ends of the piston movement during the return to a stopped position, in the form of overshooting, and which are irrelevant to the pipetting process. The possibly occurring overshooting may hinder the determination of the actual stopping of the piston at the end of a pipetting process. However, since the overshooting has no influence, according to previously implemented tests, on the amount of dosing liquid that is pipetted, an in-depth discussion of the movement behavior of the piston at the end of movement may be omitted. What is decisive for the pipetting success achieved by the whiplike piston movement is indeed the above mentioned time span which the piston requires in order to again reach the location of the halfway point during its movement in the pipetting direction, starting from the location of the halfway point, to the dead point of its movement and subsequently during its movement in the counter pipetting direction.

The movement of the piston may be detected based on any reference point on the piston, for example, based on the dosing side piston surface.

The effect of the movement course of the piston proposed according to the invention on the dosing liquid is not yet completely explained. However, an explanatory model starts from the point that, with the movement of the piston in the pipetting direction by more than the predetermined single dosing volume to be pipetted, the excitation energy or energy for breaking loose, which is required to introduce movement of the dosing liquid in the desired pipetting direction counter to the inertial forces, surface tension, adhesion, and cohesion of the dosing liquid, is transferred to the dosing liquid to be pipetted.

With the movement of the piston opposite the pipetting direction in the counter pipetting direction, in which the piston again generally sweeps over another, preferably larger volume than the single dosing volume that is actually to be pipetted, the previously excited pipetting movement of the dosing liquid is "de-energized" again.

Thus, a very short, sharp pressure pulse is transferred from the piston via the working gas to the dosing liquid.

Surprisingly, the volumes swept over by the piston in its movements, the pipetting volume and the counter pipetting volume, may be equally large. The piston may therefore be located back in the start position at the end of the pipetting process. In spite of this, one single dosing volume is pipetted.

Therefore, a "displacement balance" of the piston does not occur according to the present invention. Tests have shown instead that the actually pipetted dosing liquid volumes are a function of the piston target movement integrated with respect to time. The target piston movement may be indicated, for example, in the form of target locations of the piston along the channel path at respective target times, thus through target location-time curves. Since the target movement of the piston is a function of the control signal from the control unit, the actually pipetted amount of dosing liquid may be a function of the time-dependent curve of the control signal integrated with respect to time. Likewise, the actually pipetted volumes of dosing liquid may be a function of the actual piston movement integrated with respect to time. In turn, the actual piston movement may thus be indicated in the form of actual locations of the piston along the channel path at respective actual times, thus in the form of actual location-time curves. The limits of integration when using the actual piston movement are the two passes of the piston through the location of the halfway point.

If one of the listed variables that changes over time—the target piston movement, the control signal, the actual piston movement—is plotted on a graph with respect to time, then the area under the curve between the beginning of movement and the end of movement is the actually pipetted volume of dosing liquid. When including the actual piston movement as the evaluation variable for the pipetted volume of dosing liquid, then the relevant beginning of movement is the first passage through the location of the halfway point and the relevant end of movement is the second passage through this location.

The volume swept over by the piston, or its dosing side end face, is thereby the surface area of the projection of the dosing side end face on a projection plane orthogonal to the channel path multiplied by the piston stroke, assuming that the configuration of the end face does not change during the pipetting. As at least the dosing side end face of the piston is preferably configured as a solid body, this assumption is realistic.

"Pipetting direction" thereby designates a movement direction of the piston during aspiration which causes an intake of dosing liquid into a pipette cavity of the pipetting device, for example, in a pipette tip. During dispensation, a movement direction of the piston is designated which causes an expulsion of dosing liquid out of a pipette cavity of the pipetting device, for example, again from a pipette tip. The "counter pipetting direction" is then the movement direction of the piston opposite the respective pipetting direction.

A single dosing volume in the meaning of the present application is always then predetermined when the pipetting process is carried out with the goal of pipetting a specific known dosing volume. The single dosing volume may be entered by manual input at the pipetting device or by data transmission to the pipetting device or by calculation and/or may be predetermined from data for the pipetting device stored in a memory device.

The pipetting volume initially swept over by the dosing side end face of the piston may be a function, not only of the predetermined single dosing volume, but additionally of parameters of each dosing liquid to be pipetted and/or of the volume of the working gas between the dosing side piston surface and the dosing fluid. The following fundamentally applies: the greater the viscosity of the dosing liquid (measured at room temperature of 20° C. at an atmospheric pressure of 1013.25 hPa by means of a rotational viscometer), the greater the ratio of pipetting volume to single dosing volume. The following likewise applies: the greater the volume of the working gas, the greater the ratio of pipetting volume to single dosing volume. In the case of the preferred exchangeable pipette tips, as a rule, a working gas volume between the piston and dosing volume of 180 μm may not be underrun, and a volume of 3000 μl may not be exceeded, depending on the design.

Thus, for example, the pipetting volume may not be less than 1.5 times the single dosing volume. However, it may also be significantly greater than the single dosing volume. Thus, it may, for example, be five times the single dosing volume if a low excitation energy is sufficient to accelerate the dosing liquid to flow through the generally narrow pipette opening. Dosing liquids that may be excited less well into motion may be excited into movement with a piston movement in the pipetting direction and a pipetting volume swept over by the dosing side end face of not less than ten times the single dosing volume. Since the piston movement is preferably carried out at a higher volume rate than the volume swept over by the dosing side end face per time unit, the repeatable accuracy increases for the pipetting of very small single dosing volumes of less than 5 μl at increasing pipetting volumes. Therefore, the pipetting volume may preferably be not less than twenty-five times the single dosing volume.

Tests have shown that, in particular for the commonly pipetted class of aqueous liquids—these are, in the meaning of the present invention, liquids with a viscosity in the range from 0.8 through 10 mPa, measured at room temperature of 20° C. at an atmospheric pressure of 1013.25 hPa by means of a rotational viscometer—a pipetting volume between ten times and sixty times the single dosing volume, preferably between ten times and twenty-five times, leads to excellent dosing results. A pipetting volume between ten times and twenty-five times the single dosing volume also provides excellent dosing results for dosing liquids outside of the above listed viscosity range.

An upper limit of the pipetting volume is represented by a pipetting volume, at which more than the single dosing volume moves through the pipette opening, due to the large time duration that the piston requires to sweep over the pipetting volume with its dosing side end face. Tests have shown that pipetting volumes of more than 100-times no longer permit useful pipetting of dosing volumes of less than 5 μl.

It should be clarified at this point that the pipetting device configured according to the invention moves only the predetermined single dosing volume of dosing liquid through its pipette opening, during dispensation as well as during aspiration, despite the previously described large piston movement. No overdosing or over-pipetting with subsequent correction in the counter direction takes place. Dosing liquid is moved only in the desired pipetting direction during a pipetting process according to the invention. A pipetting process in the meaning of the present application is concluded when the piston movement in the counter pipetting direction ends.

The counter pipetting volume may be equal to the pipetting volume, even during aliquoting. However, at increasing numbers of dispensation processes in aliquot operation, a gas column may then form between the meniscus of the dosing liquid accommodated in a pipette cavity, said meniscus being closer to the pipette opening of the pipetting device, which may compromise the accuracy of further dispensation processes.

Therefore, the counter pipetting volume may be less than the pipetting volume by the single dosing volume. It may thus be ensured that the meniscus of the accommodated dosing liquid closer to the pipette opening remains at a most constant location, preferably as close as possible to the pipette opening itself, despite the dispensation processes being carried out. The counter pipetting volume may thus also be substantially larger than the single dosing volume according to the information previously provided.

However, the piston may also be initially reset in the counter pipetting direction into its piston start position at the beginning of the pipetting process and then adjusted again in the pipetting direction by the single dosing volume. The adjustment movement may then take place significantly more slowly than the piston movement during the pipetting process and is no longer considered part of the pipetting process.

The correct pipetting and counter pipetting volume for a pipetting process of small amounts of dosing liquid may be easily determined for predetermined single dosing volumes through tests.

Thus, in contrast to the quasi-synchronous pipetting operation previously described in conjunction with the prior art, an asynchronous pipetting operation is used according to the invention in which a significant section of the piston movement does not correlate to the movement of the dosing liquid. While there is a time lag between movements of the piston and dosing liquid in the same direction in the previously described quasi-synchronous pipetting operation, in the presently described asynchronous pipetting operation, movements of the piston and dosing liquid directed opposite to one another may occur in one and the same point in time or in one and the same time span, or a movement of the dosing liquid through the pipette opening may only take place after the piston has completed its movement in the counter pipetting direction and has come to a stop again.

Instead of aspirating and/or dispensing dosing liquid like before using relatively slow piston movements, in the present piston device, a pressure pulse is generated in the compressible working gas by the fast piston movement and is transferred to the incompressible dosing liquid and may there lead to the isolation of small single dosage volumes from a larger amount of dosing liquid. Due to the piston movement in the pipetting direction and in the counter pipetting direction, the specified pressure pulse comprises a rising flank and a falling flank in comparison to the surrounding atmosphere. During the aspiration, the falling pulse flank usually chronologically precedes the rising pulse flank, while it is exactly reversed during the dispensation. A negative pressure pulse is generated during the aspiration, a positive pressure pulse during the dispensation.

Regardless of when the single dosing volume of dosing liquid begins to move through the pipette opening during a dispensation process, it is common to most dispensation processes that the piston is controlled during the dispensation up to the reversal of movement direction, and the movement direction of the piston is generally actually reversed before the predetermined liquid volume has discharged from the pipette opening. By this means, a dispensation of a predetermined single dosing volume of less than 5 µl is realized in jet mode.

According to one advantageous embodiment, which is configured for dispensing single dosing volumes of less than 5 µl in jet mode, the control unit may be configured to control the movement drive to the reversal of movement direction of the piston from the dispensation direction into the aspiration direction before the predetermined liquid volume has discharged from the pipette opening. The predetermined liquid volume is then accelerated out of the pipette opening. This is also an aspect of the whiplike piston movement.

This correspondingly applies for aspiration operation, in which, however, a jet mode may not occur. Consequently, the control unit may additionally or alternatively be configured to operate the movement drive for aspiration of predetermined single dosing volumes of less than 5 µl in such a way that the piston is moved in the aspiration direction and, before the predetermined single dosing volume is completely aspirated, the movement drive is controlled to a reversal of direction of the piston so that the piston is moved in the dispensation direction.

At a sufficiently fast piston movement, it may indeed occur that the piston movement in the pipetting and counter pipetting directions is completely completed before the desired single dosing volume of dosing liquid has moved completely through the pipette opening. The piston speed may therefore likewise be an important influencing variable.

According to another aspect of the present invention, the whiplike movability of the piston in a generic pipetting device is consequently carried out in that the movement drive comprises a linear motor and that the control unit and the movement drive are configured, for pipetting a predetermined single dosing volume of less than 5 µl, to move the piston at a peak speed of at least 5000 µl/s, preferably at least 10,000 µl/s, and not more than 25,000 µl/s.

According to the aspect introduced just now, the movement speed of the piston likewise represents an aspect of the whiplike piston movement. The volume speed of the piston, thus the volume swept over by the dosing side end face of the piston per time unit, is thereby of greater importance than the linear movement speed of the piston or of a piston rod. Indeed, a shorter stroke is sufficient for pistons with larger piston surfaces to sweep over the same volume, for which a piston with a smaller piston surface requires a larger stroke. Thus, to realize increasing volume speeds, a piston with a larger piston surface might simply be moved along the channel path rather than a piston with a smaller piston surface. However, the force to break loose, for example, to overcome static friction, which is necessary for initiating a movement of the piston, increases significantly with the size of the piston, so that pistons with increasingly large piston surfaces are increasingly less controllable for the pipetting of single dosing volumes of less than 5 µl.

The present invention relates preferably to pipetting devices, whose pistons have a piston surface between 3 and 80 mm$^2$, thus which have in a circular piston surface a diameter between 2 and approximately 10 mm. In order to be able to arrange multiple pipetting channels in a row and column shaped grid with the lowest possible grid width, the present invention relates particularly preferably to pipetting devices whose pistons have a piston surface between 3 and 20 mm$^2$, which corresponds in circular piston surfaces to a diameter between 2 and approximately 5 mm.

At maximum piston speeds that are too high, for example, more than 25,000 µl/s, a liquid movement into a pipette cavity or out of the same does indeed always occur; however, the single dosing volume is generally discharged and/or aspirated in an exploded or atomized way into multiple partial volumes, which is unacceptable for high precision pipetting of the small single dosing volumes of less than 5 µl discussed here. It may be basically determined that at increasing piston speeds, the tendency increases to pipette the predetermined amount of dosing liquid into multiple partial amounts in an undesired way. According to present knowledge, at least for aqueous dosing liquids, as they are defined above, very excellent results are achieved at maximum piston speeds of approximately 10,000 µl/s with respect to precision and reproducibility of the pipetted amounts of liquid.

To provide an impression of the piston speed: the piston preferably requires less than 30 ms, preferably less than 20 ms, most preferably even less than 16 ms, for its movement in the pipetting direction and in the counter pipetting direction from the location of the halfway point to reaching this halfway point again. Movement times in the single-digit millisecond range are indeed conceivable. This applies correspondingly for the duration of the control signal from the beginning of the control signal driving the piston in the pipetting direction up to the end of the control signal driving the piston in the counter pipetting direction. Signal durations of up to 1 ms are possible for the control signal in order to pipette particularly small single dosing volumes.

A complete piston movement in the pipetting and counter pipetting directions, at a pipetting volume swept over by the dosing side end face of 30 µl and a counter pipetting volume swept over [by the same] of 29 µl, by means of which a single dosing volume of 1 µl of an aqueous dosing liquid may be easily carried out in approximately 15 ms using a piston with a circular piston face and a diameter of 4.3 mm.

However, the kinematic aspect of the whiplike piston movement does not only rely on the maximum achievable piston speed, but instead also on the time span which the movement drive requires to accelerate the piston to the desired piston speed and/or to decelerate the piston starting from the desired piston speed. Preferably, the control unit and the movement drive are therefore configured to accelerate and/or decelerate the piston to move along the channel path at an acceleration of at least $2\times10^6$ µl/s$^2$, preferably at least $6\times10^6$ µl/s$^2$, particularly preferably even at least $8\times10^6$ µl/s$^2$, and not more than $5\times10^7$ µl/s$^2$. The statements made above, with respect to the preferred piston size, indicated as piston surface, apply here.

It has been completely surprisingly shown that the pipetting of dosing liquids, in particular of aqueous dosing liquids, using the pipetting device according to the invention proposed here, is independent of the respective pipette tip used. Using the same pipetting parameters, the same pipetting result is reproducibly achieved for one and the same dosing liquid using one and the same pipetting device with different pipette tips. The pipetting result is in particular independent of the nominal pipette cavity volume of the respective pipette tip coupled to the pipetting device.

When a pipette cavity of the pipetting device is discussed in the present invention, this is preferably conceived as the pipette cavity of an exchangeable pipette tip, even if the pipette cavity may also be configured integrally with the pipetting channel.

Based on the enormous advantages for the hygiene of the dosing fluid and the pipetting process alone, the pipetting device is thus preferably configured for detachable accommodation of pipette tips. Since the pipetting devices presented here, which function using the whiplike piston movement according to the invention, also achieve a pipetting result, independent of the pipette tip, and precisely for small single dosing volumes of less than 5 µl, pipette tips may be used with the pipetting device according to the invention, whose nominal pipette cavity volumes are substantially larger than the predetermined single dosing volume. The pipette tips, which may be detachably coupled to the pipetting device, may have a nominal pipette cavity volume which is at least ten times, preferably at least twenty times, particularly at least fifty times, most preferably at least one-hundred times the single dosing volume.

Large pipette tips of this type, for example, of up to 300 µl nominal pipette cavity volume, from which single dosing volumes may be repeatedly dispensed, not only of less than 5 µl but also of less than 1 µl to approximately 50 nl, enable an advantageous aliquot operation of the pipetting device according to the invention. Thus, a large amount of dosing liquid may be aspirated once and may be discharged over a plurality of dispensation processes even in very small doses without repeated aspiration in the meantime.

As already outline above, a very fast aliquot operation is possible using the pipetting device according to the invention, in which a plurality of dispensation processes are carried out in which the pipetting volume and the counter pipetting volume respectively are the same size. A number of preferably 5 to 8 such dispensation processes has proven to be practical before the meniscus of the dosing liquid accommodated in the pipette cavity, which is closer to the pipette opening, has moved so far from the pipette opening that this distance negatively effects the dispensation accuracy.

To provide a most precise aliquoting with practically any number of dispensation processes carried out directly in series, the pipetting device may be configured in aliquot operation to carry out a plurality of dispensation processes in which the counter pipetting volume is respectively smaller than the pipetting volume. Then the position of the meniscus closer to the pipette opening remains essentially unchanged during the aliquoting.

To provide a targeted change of the single dosing volume to be respectively pipetted, it may be provided according to an advantageous refinement of the present invention, that the piston stroke in the pipetting direction and/or the piston stroke in the counter pipetting direction and/or the piston speed in the pipetting direction and/or the piston speed in the counter pipetting direction may be changeable. Generally, said parameters are set for one or more pipetting processes. They may changed between two pipetting processes if another single dosing volume is desired for a subsequent pipetting process. To adjust at least one of said parameters, the pipetting device may have an input device, for example a keyboard and/or a touchscreen and/or a mouse and the like.

Another advantage of the pipetting device presented here lies in that by using it, not only the single dosing volume of less than 5 µl, emphasized above, may be pipetted accurately and repeatedly, but also the pipetting device may basically also be operated in the previously described quasi-synchronous pipetting operation, which enables an accurate pipetting of single dosing volumes of more than 5 µl. Therefore, the control unit may also be configured to move the piston for pipetting a predetermined single dosing volume of more than 5 µl at a peak speed of not more than 1000 µl/s. At the indicated maximum speed of the piston of not more than 1000 µl/s, the dosing liquid—if necessary with a low time lag—follows the piston in movement in the same direction. The pipetting volume swept over by the piston corresponds essentially to the actually pipetted dosing liquid volume. In turn, the piston sizes specified above, indicated by the piston surface, preferably apply.

With the possibility of operating the pipetting device according to the invention both in synchronous or quasi-synchronous operation as well as in asynchronous pipetting operation, one and the same pipetting device according to the invention may be configured to reproducibly pipette a single dosing volume selectable in a dosing volume range from 100 nl to 100 µl, preferably from 100 nl to 1000 µl with a volume deviation of not more than 2% relative to the predetermined single dosing volume as a nominal volume. Thus, the pipetting device according to the invention is able to pipette 1000 times the minimum pipetting volume as a maximum pipetting volume. Naturally, it should thereby not be excluded that, for example, said lower boundary of 100 nl may still be underrun. The functionality of the pipetting device is guaranteed in any case for the specified pipetting volume ranges.

The movement drive preferably comprises a linear motor. The use of the linear motor may guarantee a sufficient movement dynamic, thus a sufficiently high acceleration of the piston and a sufficiently high achievable movement speed of the piston.

The linear drive as the movement drive of the piston may basically have a rotor which is connected to the piston for joint movement via a rod and/or gearing. However, this increases the mass to be moved jointly with the piston and the friction to be overcome in an undesired way. To provide a highest possible movement dynamic, it is therefore preferred that the piston is itself the rotor of the linear motor so that the electromagnetic field of the linear motor stator interacts directly with the piston for its acceleration and deceleration.

The above mentioned movement times for a complete piston movement in the pipetting direction and in the counter pipetting direction may be advantageously shortened if the piston itself is used as the rotor for the linear motor. Then, the complete piston movement in the pipetting and counter pipetting movement of a pipetting process may be carried out in less than 15 ms, preferably in less than 12 ms.

In order to be able to position the piston as the rotor itself most precisely in the pipetting channel and to move and accelerate it in a most defined way, it is advantageous if the piston has a plurality of permanent magnets which are provided following one another along the channel path, with a polarization direction along the channel path, and with like poles lying directly opposite one another along the channel path. Permanent magnets arranged in this way form a very precise magnetic field directly at the points at which like poles lie opposite one another, which facilitates not only the exact positioning determination by Hall sensors, but also the effective coupling of the piston-side magnetic field with the changeable, in particular movable, stator-side magnetic field.

To increase the output of the pipetting device, it may be provided that it has a plurality of parallel pipetting channels. These are, as was previously indicated, preferably arranged at the node points of a uniformly orthogonal column-row grid. The use of linear motors for driving the pistons thereby facilitates not only the high movement dynamic, described in detail above, but also the spatially dense arrangement of the plurality of pipetting channels. The distance of one pipetting channel to a closest parallel pipetting channel is preferably not greater than 12 mm, particularly preferably not greater than 10 mm. The distance is thereby the same as the grid spacing.

The pipetting device may be configured for increasing the pipetting accuracy for controlling the piston movement. The piston movement is preferably controlled as a function of the pressure of the working gas. For this purpose, the pipetting channel may be provided with a pressure sensor which may be arranged and configured to detect the pressure of the working gas between the dosing side end face of the piston and the dosing liquid to be pipetted. The pressure sensor is preferably connected in a data transmitting way with the control unit so that the control unit may control the piston movement as a function of detection signals from the pressure sensor. The pressure sensor is preferably configured for pressure detection in the microsecond range, preferably in the submicrosecond range, in order to facility an exact control, even of the whiplike piston movement described above.

According to another aspect of the present invention, the technical problem specified at the outset is solved by a generic method, in which the movement of the piston along the channel path for pipetting a single dosing volume of less than 5 µl comprises the following substeps:

Moving the piston, starting from a start position, in the pipetting direction and thereby sweeping over a pipetting volume with the dosing side end face, which pipetting volume is not less than 1.4 times greater than the single dosing volume, and subsequently Moving the piston in the counter pipetting direction, wherein not more than 50 ms, preferably not more than 30 ms, elapse between the time points at which the piston reaches that point of directional reversal from the pipetting direction into the counter pipetting direction, which corresponds to the halfway point between the piston start position and the piston reversal point.

On the control side, the technical problem specified at the outset is also solved by a generic method in which the movement of the piston along the channel path for pipetting a single dosing volume of less than 5 µl comprises the following substeps:

Generating a control signal for moving the piston, starting from a start position, in the pipetting direction and thereby sweeping over a pipetting volume with the dosing side end face, which is not less than 1.4 times greater than the single dosing volume, and subsequently Generating a control signal for moving the piston in the counter pipetting direction,
wherein not more than 50 ms, preferably not more than 30 ms, elapse between the beginning of the control signal for moving the piston in the pipetting direction and the end of the control signal for moving the piston in the counter pipetting direction.

Preferably, not more than 20 ms elapse between the specified limits, particularly preferably not more than 15 ms.

To explain the method according to the invention, reference is made to the above description of the pipetting device configured for carrying out this method. Reference is further made to the fact that, the embodiments described above of the pipetting device according to the invention are also understood as a disclosure of process operations in the sense of a refinement of the method according to the invention described above and vice versa.

In order to achieve the preferred whiplike piston movement, the control of the movement of the piston in the counter pipetting movement is carried out directly after the control of the movement of the piston in the pipetting direction, without the piston undergoing a motionless resting phase between these movements—with the exception of an unavoidable stop at the dead point of the reversal of movement with the likewise unavoidable renewed overcoming of static friction.

According to another aspect of the present invention, the whiplike piston movement may be realized in that, during the pipetting process, the piston is moved in a direction opposite the movement of the dosing liquid through a pipette opening. This counter directional movement of the piston and the dosing liquid through the pipette opening preferably occur after the reversal of movement of the piston. Reference is made again to the above explanations regarding the correspondingly configured pipetting device.

Reference is made again to the fact that the counter directional movement of the piston and dosing liquid does not necessarily have to occur. At sufficiently high piston speeds and piston accelerations, it may indeed be the case that the piston movement is ended in the counter pipetting direction before the dosing liquid begins to move through the pipette opening.

Regardless of whether the dosing liquid has moved through the pipette opening during the movement of the piston in the pipetting direction, the reversal of direction of the piston from the dispensation direction into the aspiration direction may be carried out during the dispensation before the predetermined single dosing volume is torn off by the pipette opening or has completely exited the pipette opening.

As was already explained above, this correspondingly also applies for the aspiration: the reversal of direction of the piston from the aspiration direction into the dispensation direction may be carried out during the aspiration before the predetermined single dosing volume has completely flowed through the pipette opening.

Another aspect of the whiplike piston movement lies—as was likewise comprehensively explained above—in the maximum speed of the piston during its movement along the channel path. To achieve a whiplike piston movement, the piston may advantageously be moved in the pipetting direction and/or in the counter pipetting direction a maximum speed of at least 5000 µl/s, preferably at least 10,000 µl/s, and not more than 25,000 µl/s. The preferred piston sizes, indicated by the piston surface, as described above, apply.

Likewise, one aspect of the whiplike piston movement lies in the acceleration and/or in the deceleration with which the piston is brought to a desired piston speed or is decelerated starting from a piston speed. According to one preferred embodiment of the present method, the piston is accelerated and/or decelerated for movement along the channel path in the pipetting direction and/or in the counter pipetting direction at an acceleration of at least $2 \times 10^6$ µl/s$^2$, preferably at least $6 \times 10^6$ µl/s$^2$, particularly preferably even at least $8 \times 10^6$ µl/s$^2$. At accelerations above $5 \times 10^7$ µl/s$^2$, likewise at piston speeds of more than 25,000 µl/s, there is a risk of an undesired atomization of the amount of liquid to be pipetted.

The pipetting method according to the invention is preferably carried out in aliquot operation in such a way that, for one aspiration of dosing liquid, a plurality of dispensing processes follows with a dispensed single dosing volume of less than 5 µl in each case without additional aspirations in the meantime. Preferably, one aspiration is followed by 10 to 3000 dispensation processes before dosing liquid is aspirated again. 3000 dispensation processes without intervening aspiration are possible since the currently described method allows for the precisely repeatable dispensation of single dosing volumes of 100 nl from a completely filled pipette tip comprising a nominal pipette cavity volume of 300 μl.

The piston is preferably moved during pipetting, in particular during aliquoting, in the counter pipetting direction back into the piston start position or into an end position displaced in the pipetting direction with respect to the piston start position, wherein the displacement corresponds to the pipetted single dosing volume multiplied by the respective dosing side piston surface.

All previously outlined aspects of the whiplike piston movement have in common that, during dispensation, the movement of the piston in the counter pipetting direction, thus in the aspiration direction, does not lead to a movement of the dosing liquid through the pipette opening into the pipette tip, in contrast to the prior art.

Figure 2:
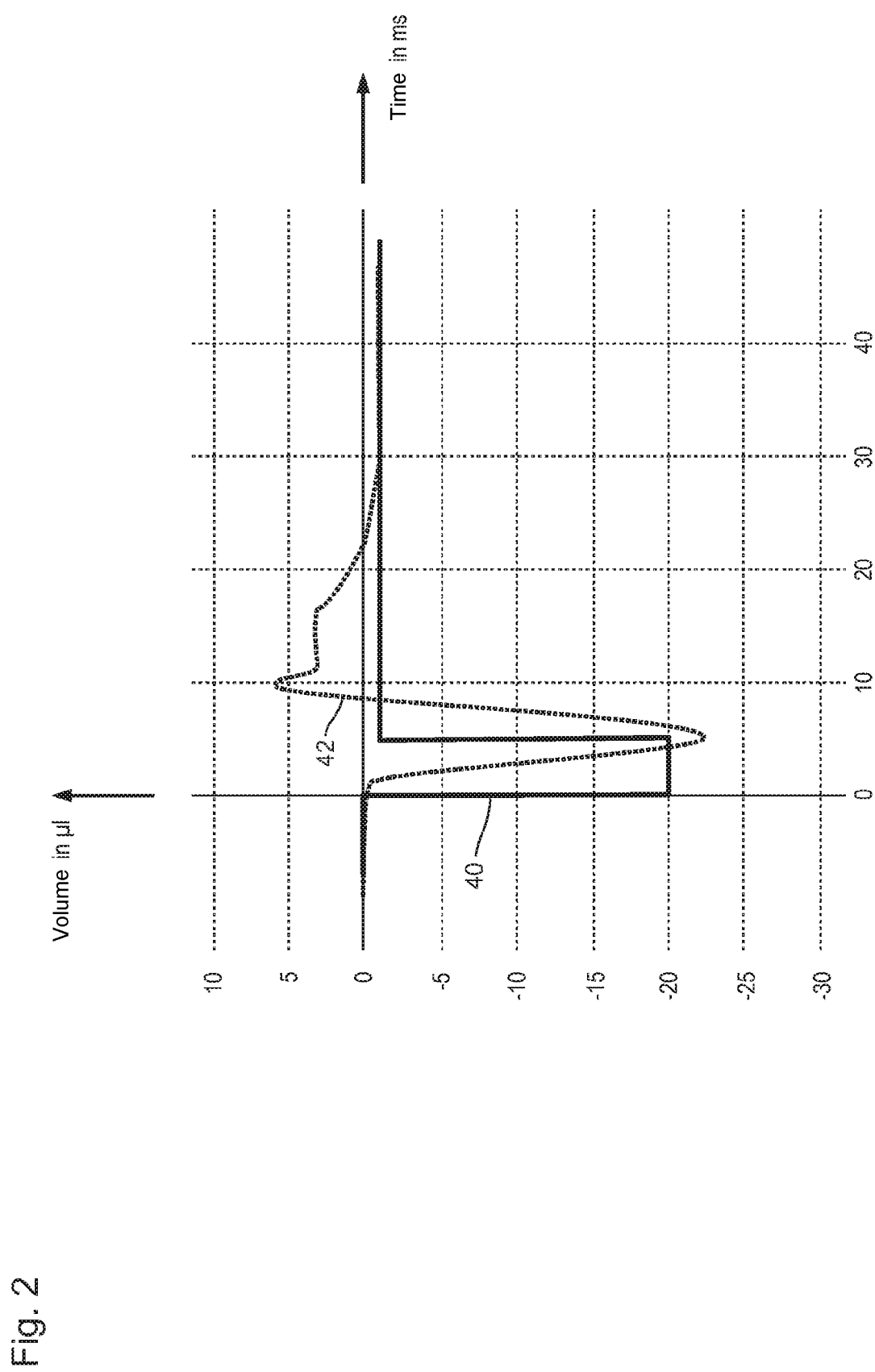
Figure 3:
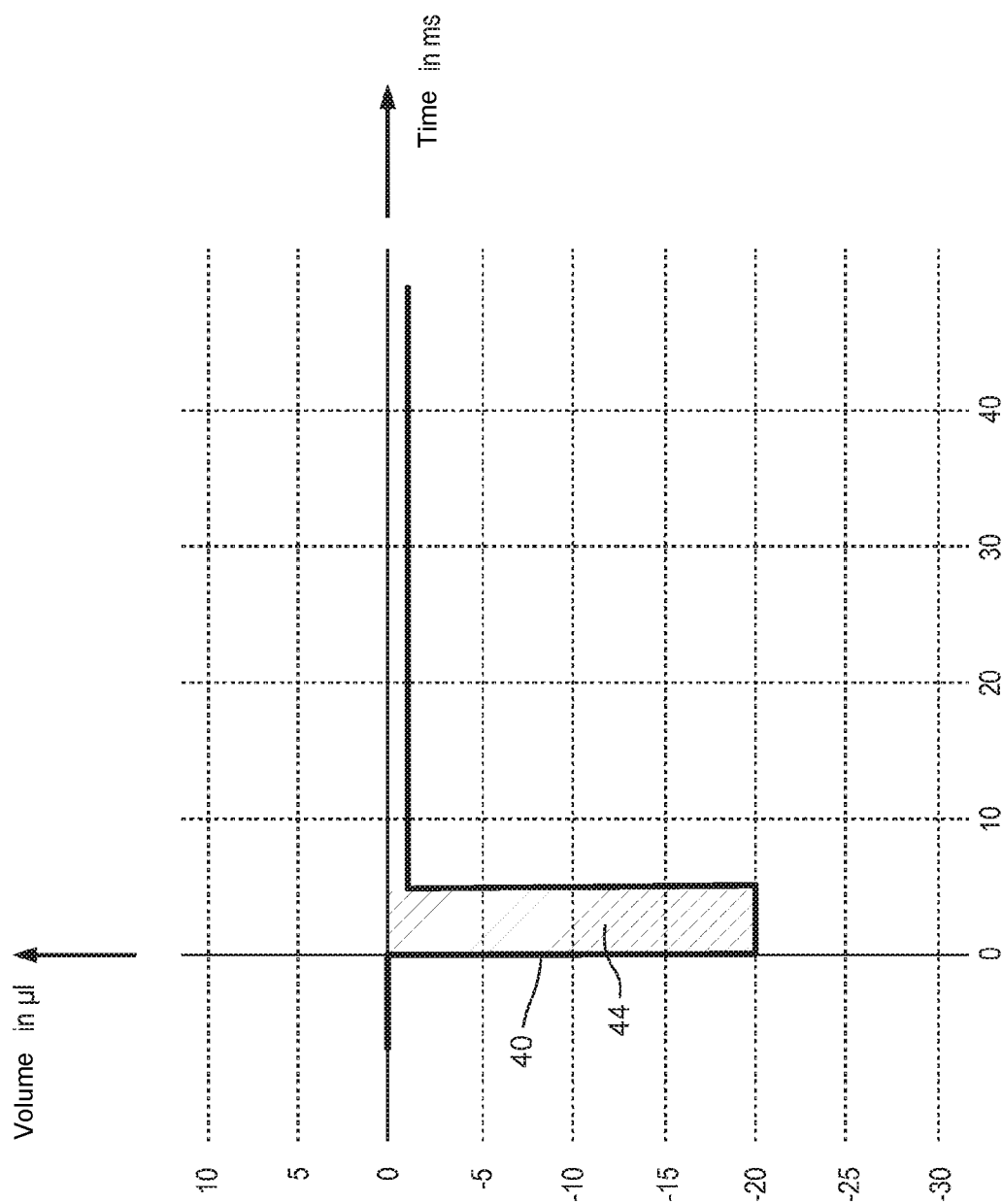
Figure 4:
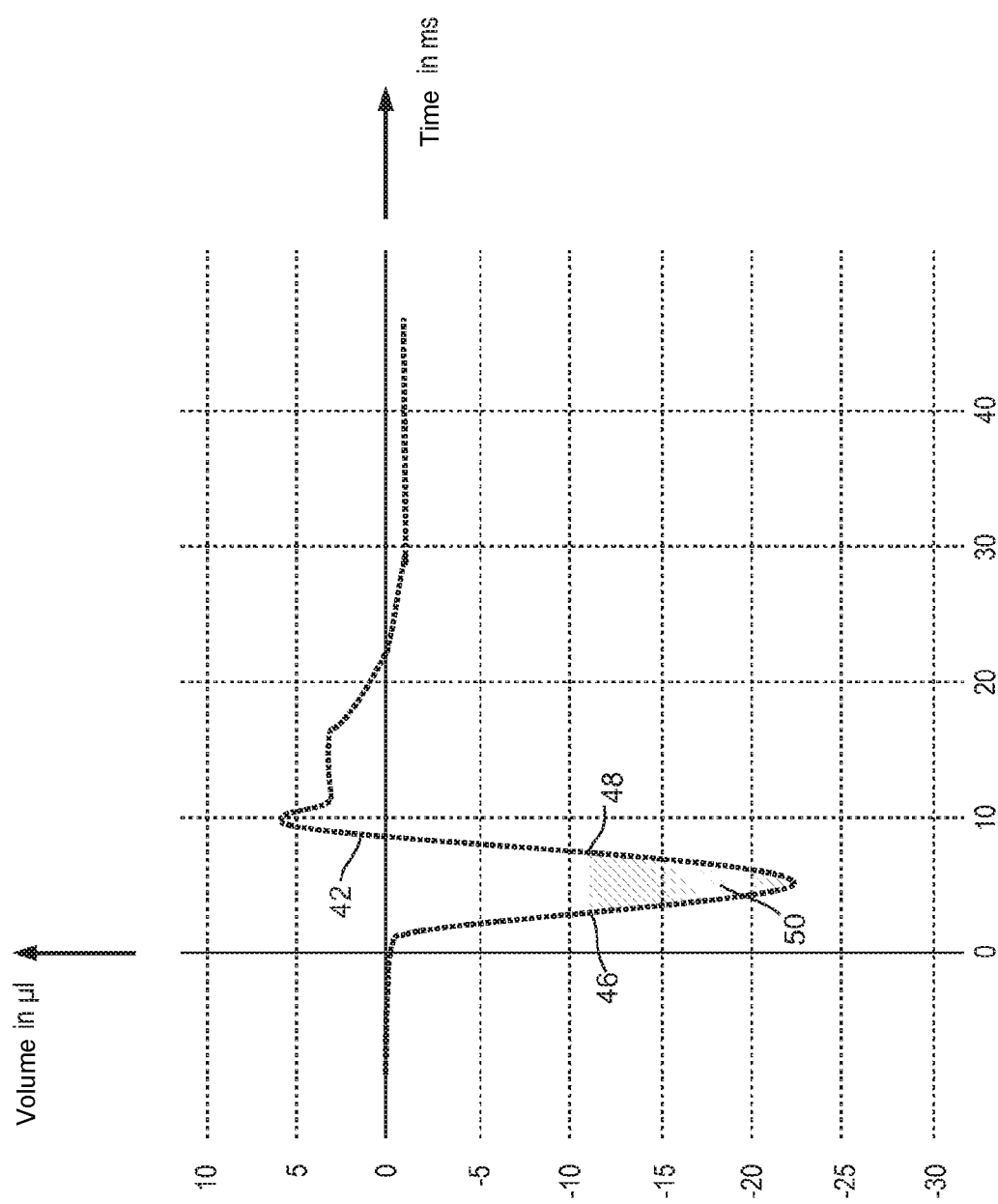

The present invention is subsequently described in greater detail by way of the accompanying drawings. As shown in:

FIG. 1a a pipetting device according to the invention, in which a dispensation method according to the invention may be carried out, in the configuration before beginning the dispensation, FIG. 1b the pipetting device from FIG. 1a after completion of the pipetting movement of the piston with the piston in the lower dead point position, FIG. 1c the pipetting device from FIGS. 1a and 1b after completion of the piston movement for dispensing a single dosing volume of 1 μl, FIG. 2 a roughly schematic graph of the temporal curves of a control signal and the piston movement affected thereby of the pipetting process from FIGS. 1a through 1c, FIG. 3 the depiction from FIG. 2 with only the control signal, and FIG. 4 the depiction from FIG. 2 with only the location-time curve of the piston.

In FIGS. 1a through 1c, a pipetting device according to the invention is generally designated with 10. This comprises a pipetting channel 12, formed by a cylinder, which extends along a channel path K configured as a straight channel axis. A piston 14 is accommodated in said pipetting channel 12 to be movable along channel path K.

Piston 14 comprises two end caps 16 (only the lower of which is provided with a reference numeral in FIG. 1 for reasons of clarity), between which a plurality of permanent magnets 18 (in the present example three permanent magnets 18) are accommodated. Permanent magnets 18 are polarized along channel axis K for achieving a selective magnetic field along channel path K, and are arranged in pairs with like poles facing one another. A magnetic field arising from piston 14 results from this arrangement and is largely uniform about channel axis K, thus is essentially rotationally symmetrical with respect to channel axis K and which has a high gradient of magnetic field strength along channel axis K, so that the unlike polarization zones selectively alternate along channel path K. Thus, for example, a high positional resolution may be achieved by Hall sensors (not shown) during the position detection of piston 14 along channel axis K, and a very efficient coupling of an outer magnetic field to piston 14 may be achieved.

End caps 16 are preferably formed from low-friction, graphite-containing material, as is known, for example, for commercially obtainable pistons from Airpot Corporation in Norwalk, Conn. (US). In order to be able to exploit the low friction provided by this material to the greatest extent, pipetting channel 12 is preferably configured as a glass cylinder so that, during a movement of piston 14 along channel axis K, the graphite-containing material slides at very low friction on a glass surface.

Piston 14 thus forms a rotor of a linear motor 20, whose stator is formed by coils 22 (here for example, only four coils are shown by way of example) surrounding pipetting channel 12.

Reference is explicitly made to the fact that FIGS. 1a through 1c merely show a rough schematic longitudinal cutaway view of a pipetting device 10 according to the invention, which is not to be understood as drawn to scale. Furthermore, numerous components are depicted by an arbitrary number of components, like, for example, three permanent magnets 18 and four coils 22. In fact, both the number of permanent magnets 18 and also the number of coils 22 may be greater than or less than the number shown.

Linear motor 20, more precisely its coils 22, are controlled via a control unit 24, which is connected in a signal transmitting was to coils 22. The transmission of electrical current to energize the coils and thus the generation of a magnetic field by the same is considered as a signal.

A pipette tip 26 is detachably applied on the dosing side end 12a of pipetting channel 12 in a known way. The connection of pipetting tip 26 to dosing side longitudinal end 12a of pipetting channel 12 is likewise depicted only roughly schematically.

Pipette tip 26 defines a pipette cavity 28 in its interior, which cavity is accessible on the longitudinal end 26a away from the coupling only by a pipette opening 30.

In the example of a dispensation method shown in FIG. 1, an amount of dosing liquid 32 is accommodated in pipette cavity 28. This is carried out by a conventional aspiration process in the quasi-synchronous pipetting operation by the same pipetting device 10.

A working gas 34 is located continuously between piston 14 and dosing liquid 32, which functions as a force transmitter between piston 14 and dosing liquid 32.

Working gas 34 is also arranged in the case of a completely emptied pipette tip 26 between piston 14 and dosing liquid 26, since pipette tip 26 is immersed in a dosing liquid reservoir for aspiration of the corresponding dosing liquid, so that in this state a meniscus of dosing liquid is present at least at pipette opening 30. Thus, working gas 34 is located in each state of pipetting device 10 relevant for a pipetting process constantly completely between piston 14 and dosing liquid 32 and separates them from one another.

More precisely, working gas 34 is located between a dosing side end face 14a of piston 14, which in the present example is formed by an end face of end cap 16 facing toward dosing opening 30 in the axial direction, with respect to channel path K.

Starting from the state shown in FIG. 1a, a dispensation process of pipetting device 10 according to the invention and the dispensation method carried out thereby are subsequently described:

The central point of the concept according to the invention of the present application is a whiplike movement of piston 14. This whiplike movement is reflected—as has been described above in detail—in multiple aspects, of which each represents its own concept according to the invention with respect to the prior art.

Based on the provided linear motor 20, piston 14 may be moved with enormous movement dynamics along channel axis K. To dispense a very small amount of liquid, approximately 1 μl of dosing liquid 32, piston 14 is initially moved fast in the pipetting direction (here, the dispensation direction) toward dosing opening 30. Control unit 24 controls coils 22 of linear motor 20 in such a way that piston 14 executes a stroke P which is so large that dosing side end face 14*a* of piston 14 sweeps over a multiple, approximately 20 times the predetermined single dosing volume 36 (see FIG. 1*c*). The piston is then located in the position shown in FIG. 1*b* at the lower dead point of its movement in the pipetting direction, whereupon piston 14 is driven into a movement in the counter pipetting direction (see arrow G). The counter pipetting direction is in this case an aspiration direction in which a movement of piston 14 causes a reduction of the pressure of working gas 34 between piston 14 and dosing liquid 32.

The movement of piston 14 in the pipetting direction lasts less than 10 ms. When piston 14 has reached its lower dead point, no part of dosing liquid 32 has as yet been released from pipette tip 26.

The piston is moved in the pipetting direction for example at a maximum speed of approximately 10,000 µl/s, and is additionally accelerated at an acceleration of up to $8\times10^6$ µl/s$^2$ and decelerated again. The maximum speed occurs, however, only for a short time. This means that the piston in the specified case, in which its dosing side end face 14*a* sweeps over a volume of approximately 20 times single dosing volume 36, thus approximately 20 µl, in the course of the pipetting direction, requires approximately 6 to 8 ms for this pipetting movement.

Dosing liquid 32 is in this case too inert to follow this piston movement. Instead, a pressure increase pulse is transmitted from piston 14 via working gas 34 to dosing liquid 32 in pipette tip 26. Starting from the depiction shown in FIG. 1*b*, piston 14 is now accelerated back in counter pipetting direction 14 as immediately as possible, wherein movement stroke G in the counter pipetting direction is lower in the current case than the stroke P for moving in the pipetting direction, so that end-side piston surface 14*a* sweeps over a counter pipetting volume, in the course of the movement in the counter pipetting direction, which is smaller than the pipetting volume swept over by single dosing volume 36.

However, this does not have to be the case. The counter pipetting volume may be exactly as large as the pipetting volume. A counter pipetting volume reduced by single dosing volume 36 has the advantage, however, that the position of the meniscus closer to the pipette opening does not change after the pipetting, which is advantageous primarily in aliquot operation.

In the end position of pipetting device 10, shown in FIG. 1*c*, after the end of the pipetting processes, dosing side end face 14*a* is located at a distance from the start position of FIG. 1*a* resulting from stroke H, wherein, in the example depicted, the piston surface of piston 14 corresponds to single dosing volume 36 multiplied by resulting stroke H.

The movement in the counter pipetting direction is also carried out at the specified maximum speed so that this movement also requires approximately 6 to 8 ms. With additional dwell time at the lower dead point, which may occur due to overcoming the static friction limit, and including potentially occurring movement overshoots by piston 14 around its target position, the entire piston movement up to reaching the end position, as is shown in FIG. 1*c*, is carried in approximately 14 to 30 ms.

Only after the reversal of the piston movement from the pipetting direction into the counter pipetting direction is a defined single dosing volume 36 accelerated away in the form of a drop from pipette opening 39. This drop moves along extended channel path K to a dosing target, for example, a container or a well, placed under pipette opening 30.

Pipette opening 26 may have a nominal pipette cavity volume substantially exceeding the single dosing volume.

The movement of piston 14 in the counter pipetting direction is carried out in turn so fast that a pressure reduction pulse is transmitted from dosing side end face 14*a* to dosing liquid 32 in pipetting volume 28.

The pressure increase pulse of the piston movement in the pipetting direction forms the steeply rising flank of a pressure pulse, whose steeply falling flank forms the pressure reduction pulse of the piston movement in the counter pipetting direction. The shorter the individual piston movement is over time, the steeper the flank of the pressure changing pulse assigned to it. The two pressure changing pulses acting in opposite directions may thus define one "hard" pressure pulse with steep flanks.

The occurrence of the thus formed "hard" pressure pulse leads to an extremely precise repeatable pipetting result.

Surprisingly, the pipetting process depicted here is independent of the size of the selected pipette tip 26, particularly for dispensation. The same piston movement described above would also lead to exactly the same result, even at a significantly smaller pipette tip of, for example, a nominal pipette cavity volume of 50 µl, provided that the same working gas and the same dosing liquid are used at otherwise unchanged pipetting parameters.

Thus, the present pipetting device according to the invention and the pipetting method depicted according to the invention are excellently suited for the aliquoting of liquids, even from large reservoirs of dosing liquid 32 accommodated in pipette tips 26. Even over many aliquot cycles, the pipetting behavior of pipetting device 10 does not change under otherwise identical conditions. The pipetting behavior of pipetting device 10 according to the invention is thus also independent of the degree of filling of pipette tip 26 coupled to pipetting channel 12.

It is indicated in FIG. 1*c* that a pressure sensor 38 may detect the pressure in the interior of pipetting channel 12, thus the pressure of working gas 34 between dosing liquid 32 and dosing side end face 14*a* of piston 14, and may transmit to control unit 24 via a control line. Thus, when using correspondingly fast pressure sensors 38, a movement control of the piston, which is dependent on the pressure of working gas 34, to execute a whiplike piston movement, as described above, is indeed possible.

The piston movement may, due to mass inertia, not follow the control signal establishing the movement with complete precision. At points of large dynamic forces—namely at the reversal of the movement direction from the pipetting direction into the counter pipetting direction, yet also when stopping the piston—the piston may tend to overshoot. In cases of doubt, the control signals establishing the movement are decisive, which are a reflection of a target movement.

In FIG. 2, a temporal curve 40 of a control signal (solid line) and a temporal curve 42 of the movement of piston 14 (dotted line) are schematically depicted in a roughly schematic way and merely by way of example, as they might occur during one pipetting process from FIGS. 1*a* through 1*c*.

The current piston position at the beginning of the pipetting process, thus the piston position shown in FIG. 1*c*, is selected in FIG. 2 as the zero point line.

The horizontal axis of the depiction in FIG. 2 shows the time in milliseconds, wherein a grid of 10 ms is selected.

The vertical axis shows the volume in microliters, wherein, with respect to the location-time curve 42 of piston 14, the volume of the vertical axis indicates the volume swept over by dosing side end face 14a of piston 14.

The control signal of graph 40 is indeed an electrical signal; however, it may also be interpreted as a target location-time curve of piston 14 and therefore is likewise indicated in microliters in the sense of a target volume swept over by dosing side end face 14a of piston 14.

Control signal 40 is a square wave signal that jumps at time t=0 from 0 to −20 µl, thus twenty times single dosing volume 36. The negative sign results from the movement direction: a volume swept over during the movement of dosing side end face 14a of piston 14 toward pipette opening 30 is negative; a volume swept over during movement away from the pipette opening is positive. This sign convention applies both for control signal 40 and also for actual movement 42 of piston 14.

After 5 ms, square wave signal 40 jumps back to −1 µl, so that control signal 40—as previously described in conjunction with FIGS. 1a through 1c—indicates a target pipetting volume of 20 µl and a target counter pipetting volume of 19 µl, which should be swept over within 5 ms.

Piston 14 may naturally not exactly follow square wave signal 40, as a square wave control signal would demand a virtually infinitely fast movement in order to follow the falling flank (which indicates the pipetting volume) and the rising flank (which indicates the counter pipetting volume) of control signal 40.

Due to the frictional forces to be overcome, the inertial mass that must likewise be overcome, and other additional influences, for example, the work to be carried out by the working gas, piston 14 begins to move approximately 1 ms after the start of the control signal at 0 ms; however, it requires approximately an additional 4 ms to reach its lower dead point at which piston 14 immediately reverses its movement direction.

This means that piston 14 thus reaches its lower dead point when control signal 40 has jumped to its end value of −1 µl.

Due to inertial mass, the piston movement may slightly overshoot in the pipetting direction, so that dosing side end face 14a not only sweeps over the −20 µl actually indicated by control signal 40, but actually may pass over approximately −22.5 µl before it starts to reverse its direction.

As is clear from curve 42 in FIG. 2, piston 14 reaches its target position at approximately 8 ms; however, it overshoots substantially and actually stops in its target end position approximately 29 ms after the beginning of the control signal.

The overshooting depicted around the end of the piston movement in the counter pipetting direction does not, however, have an influence on the actually pipetted amount of dosing liquid.

Only control signal curve 40 is shown again in FIG. 3. As has been generally explained above, the integral of signal 40 is, from the beginning of the control signal (segment) acting on the piston movement in the pipetting direction up to the end of the control signal (segment) acting on the piston movement in the counter pipetting direction, a measure for the volume of dosing liquid actually pipetted during the controlled pipetting process. The integral thus described corresponds to the area circumscribed by control signal 40 within said temporal limits. This area is shown with crosshatching in FIG. 3 as area 44. The area reaches up to the zero line of the volume, from which control signal 40 originated. It is therefore insignificant whether the control signal actually returns to the zero line or ends displaced in the pipetting direction by single dosing volume 36.

The actual correlation between area 44 circumscribed by control signal 40 and the volume of dosing liquid actually pipetted thus may be empirically determined very easily for different liquid classes and stored in a data memory.

Only location-time curve 42 of piston 14 is shown in FIG. 4 without control curve 40. 46 and 48 indicate the "halfway point" of piston 14 between its start position at 0 µl and its reversal point of the movement direction at approximately −22.5 µl. The halfway point therefore lies at approximately −11.25 µl.

The time integral of the location-time curve of piston 14—represented by the location-time curve of dosing side piston face 14a as a reference point of piston 14—between passing through the location of the halfway point during movement in the pipetting direction and the repeated passing through of this point during its movement in the counter pipetting direction, is a measure for single dosing volume 36 actually pipetted with the piston movement. An area formed by this integral is depicted crosshatched in FIG. 4 as area 50. The surface area of area 50 is likewise a measurement for the actually pipetted single dosing volume 36 like the surface area of area 44 from FIG. 3. The relationship between the surface area of area 50 and the actually pipetted single dosing volume 36 may, however, be different from that between the surface area of area 44 and single dosing volume 36. This relationship may also be easily empirically determined for different liquid classes and stored in a data memory of the pipetting device.

Thus, very small single dosing volumes 36 of less than 5 µl may be pipetted with a high degree of repeatable accuracy using the same pipetting device 10 with which large pipetting volumes of multiple 100 µl may also be pipetted.

The invention claimed is:

1. A pipetting device for pipetting dosing liquids, wherein pipetting comprises an aspiration and a dispensation of the dosing liquid, comprising a pipetting channel extending along a channel path, in which a piston configured at least partially as a solid body is accommodated to be movable along the channel path in order to change, by way of movement along the channel path, the pressure of a working gas that wets the piston on a dosing side end face facing the dosing liquid, wherein the pipetting device comprises a movement drive for the piston by means of which the piston is drivable to move along the channel path, wherein the pipetting device has a control unit for controlling the movement drive which is configured to operate the movement drive in dispensation operation in such a way that the piston is initially moved along the channel path in a dispensation direction increasing the pressure of the working gas, and is subsequently moved in an aspiration direction opposite the dispensation direction reducing the pressure on the working gas, wherein at least the dosing side end face of the piston facing the dosing liquid is configured as a solid body, wherein the control unit is configured to operate the movement drive for pipetting a predetermined single dosing volume of less than 5 µl in such a way that the piston is moved in a pipetting direction and its dosing side end face thereby sweeps over a pipetting volume which is not less than 1.4 times greater than the predetermined single dosing volume, and that the piston is subsequently moved in a counter pipetting direction opposite the pipetting direction and its dosing side end face thereby sweeps over a counter pipetting volume, wherein during aspiration of the dosing liquid the pipetting direction designates a movement direction of the piston which causes an intake of the dosing liquid into a pipette cavity, and wherein during dispensation of the dosing liquid the counter pipetting direction designates a movement direction of the piston which causes an expulsion of the dosing liquid out of the pipette cavity, wherein not more than 50 ms elapse between the beginning of the control signal from the control unit for driving the piston in the pipetting direction and the end of the control signal for driving the piston in the counter pipetting direction.

2. The pipetting device according to claim 1, wherein the control unit is configured to operate the movement drive for pipetting the predetermined single dosing volume of less than 5 µl in such a way that the piston is moved, starting from a start position, in the pipetting direction, and its dosing side end face thereby sweeps over a pipetting volume that is not less than 1.4 times greater than the predetermined single dosing volume, and that the piston is subsequently moved, starting from a reversal point in the movement direction, in a counter pipetting direction opposite the pipetting direction, and its dosing side end face thereby sweeps over a counter pipetting volume, wherein not more than 50 ms elapse between the moments in time at which the piston is at the point, in the pipetting direction and in the counter pipetting direction respectively, which point corresponds to the halfway point between the piston start position and the piston reversal point.

3. The pipetting device according to claim 1, wherein the pipetting volume is not less than five times and not more than 100 times the predetermined single dosing volume.

4. The pipetting device according to claim 1, wherein the counter pipetting volume is equal to the pipetting volume or is less than the pipetting volume by the predetermined single dosing volume.

5. The pipetting device according to claim 1 wherein the control unit is configured, for dispensing the predetermined single dosing volume of less than 5 µl in jet mode, in which a predetermined dispensed liquid volume has left a pipette opening of the pipetting device before said liquid volume reaches a surface of a dosing target, to control the movement drive to reverse the movement direction of the piston from the dispensation direction into the aspiration direction before the predetermined liquid volume detaches from the pipette opening.

6. The pipetting device according to claim 1 wherein the control unit is configured, for aspirating the predetermined single dosing volume of less than 5 µl, to operate the movement drive in such a way that the piston is moved in the aspiration direction and to control the movement drive to reverse the direction of the piston so that the piston is moved in the dispensation direction before the predetermined single dosing volume is completely aspirated.

7. The pipetting device according to claim 1, wherein the control unit and the movement drive are configured, in order to pipette a predetermined single dosing volume of less than 5 µl, to move the piston at a peak speed of at least 5000 µl/s and not more than 25,000 µl/s.

8. The pipetting device according to claim 1, wherein the pipetting device is configured for detachable accommodation of pipette tips with a nominal pipette cavity volume that is at least ten times the predetermined single dosing volume.

9. The pipetting device according to claim 1, wherein the pipetting device is configured for aliquoting.

10. The pipetting device according to claim 9, wherein the pipetting device in aliquot operation is configured to carry out a plurality dispensation processes in which the pipetting volumes and the counter pipetting volumes respectively are the same size.

11. The pipetting device according to claim 9, wherein the pipetting device in aliquot operation is configured to carry out a plurality of dispensation processes in which the counter pipetting volumes respectively are less than the pipetting volumes by the predetermined single dosing volume.

12. The pipetting device according to claim 1, wherein the piston stroke in the pipetting direction and/or the piston stroke in the counter pipetting direction and/or the piston speed and/or the piston acceleration are changeable.

13. The pipetting device according to claim 1, wherein the control unit is configured to move the piston for pipetting the predetermined single dosing volume at a peak speed of not more than 1000 µl/s.

14. The pipetting device according to claim 1, wherein the movement drive comprises a linear motor.

15. The pipetting device according to claim 14, wherein the piston is the rotor of the linear motor so that the electromagnetic field of the linear motor stator interacts directly with the piston for its acceleration and deceleration.

16. The pipetting device according to claim 15, wherein the piston has a plurality of permanent magnets which are provided following one another along the channel path, with the polarization direction along the channel path, and with like poles directly opposite one another along the channel path.

17. The pipetting device according to claim 1, wherein it has a plurality of parallel pipetting channels which are arranged at the node points of a uniformly orthogonal column-row grid, wherein the distance of one pipetting channel to an adjacent parallel pipetting channel is not greater than 12 mm.

18. A pipetting method for pipetting, thus for aspirating and dispensing, a predetermined single dosing volume of a dosing liquid, comprising the following steps:
  Providing a quantity of working gas and a pipetting volume, which is accessible through a pipette opening and is at least partially filled with the working gas,
  Providing a piston moveable along a channel path in the pipetting direction and in a counter pipetting direction opposite thereto, and
  Moving the piston along the channel path and thus changing the pressure of the working gas by means of the dosing side end face of the piston facing the pipette opening and by this means pipetting the dosing liquid,
wherein the movement of the piston along the channel path for pipetting a single dosing volume of less than 5 µl comprises the following substeps:
  Moving the piston, starting from a start position, in the pipetting direction and thereby sweeping over a pipetting volume with the dosing side end face, which pipetting volume is not less than 1.4 times greater than the single dosing volume, and subsequently,
  Moving the piston in the counter pipetting direction,
wherein not more than 50 ms elapse between the moments in time at which the piston is at that point, in the pipetting direction and the counter pipetting direction respectively, which point corresponds to the halfway point between the piston start position and the piston reversal point.

19. The pipetting method according to claim 18, wherein, during dispensation, the reversal of direction of the piston from the dispensation direction into the aspiration direction is carried out before the predetermined single dosing volume has completely separated from the pipette opening.

20. The pipetting method according to claim 18, wherein, during aspiration, the reversal of direction of the piston from the aspiration direction into the dispensation direction is carried out before the predetermined single dosing volume has completely flowed through the pipette opening.

21. The pipetting method according to claim 18, wherein the piston is moved in the pipetting direction and/or in the counter pipetting direction at a peak speed of at least 5000 µl/s and not more than 25,000 µl/s.

* * * * *